(12) United States Patent
Olson

(10) Patent No.: US 9,971,852 B2
(45) Date of Patent: May 15, 2018

(54) ROBOTICS CONNECTOR

(71) Applicant: Geoffrey E Olson, Wilsonville, OR (US)

(72) Inventor: Geoffrey E Olson, Wilsonville, OR (US)

( * ) Notice: Subject to any disclaimer, the term of this patent is extended or adjusted under 35 U.S.C. 154(b) by 761 days.

(21) Appl. No.: 14/510,031

(22) Filed: Oct. 8, 2014

(65) Prior Publication Data
US 2015/0127130 A1 May 7, 2015

Related U.S. Application Data

(60) Provisional application No. 61/900,572, filed on Nov. 6, 2013.

(51) Int. Cl.
| | |
|---|---|
| *B25J 9/16* | (2006.01) |
| *G06F 9/00* | (2006.01) |
| *B25J 9/00* | (2006.01) |
| *B25J 5/00* | (2006.01) |
| *G06F 17/50* | (2006.01) |
| *G05B 19/4097* | (2006.01) |

(52) U.S. Cl.
CPC ......... *G06F 17/50* (2013.01); *G05B 19/4097* (2013.01); *G06F 17/5086* (2013.01); *G05B 2219/35006* (2013.01); *G05B 2219/35027* (2013.01); *G06F 2217/06* (2013.01); *Y02P 90/265* (2015.11)

(58) Field of Classification Search
CPC .... G06F 17/50; G06F 17/5086; Y02P 90/265; B29C 67/0088; G06Q 10/06; Y10S 901/01; Y10S 901/47; B25J 9/1697; B25J 9/1664; B25J 5/00
See application file for complete search history.

(56) References Cited

U.S. PATENT DOCUMENTS

| | | | | |
|---|---|---|---|---|
| 8,958,911 B2* | 2/2015 | Wong | ................... | G05D 1/024 |
| | | | | 700/258 |
| 9,044,857 B2* | 6/2015 | Sommerville | ......... | B25J 9/1602 |
| 9,592,609 B2* | 3/2017 | LaFary | .................. | G06N 3/008 |
| 9,623,608 B2* | 4/2017 | Bickel | ................ | B29C 67/0088 |
| 9,646,113 B2* | 5/2017 | Park | ....................... | A61B 17/15 |
| 2005/0212797 A1* | 9/2005 | Lee | ........................ | G06T 17/005 |
| | | | | 345/419 |

(Continued)

OTHER PUBLICATIONS

E. Sifakis, FEM simulation of 3D deformable solids: a practitioner's guide to theory, discretization and model reduction, Aug. 2012, 50 pages.*

(Continued)

*Primary Examiner* — Thuy Dao
(74) *Attorney, Agent, or Firm* — Law Firm of Timothy Myers; Timothy F. Myers

(57) ABSTRACT

A modular industrial robotics (MIR) connector object module has a graphical image property for a 3D solid model program. It also includes a component identifier property configured to identify a component in the 3D solid model program and an abstract data type property having a coordinate transform matrix describing a 3D position and orientation of the MIR connector object module relative to a coordinate system of the component in the 3D solid model program. The MIR connector object module is configured to be attachable to one of multiple components in the 3D solid model program.

20 Claims, 8 Drawing Sheets

(56) References Cited

U.S. PATENT DOCUMENTS

| | | | | |
|---|---|---|---|---|
| 2007/0253599 | A1* | 11/2007 | White | G01R 33/56509 382/107 |
| 2012/0290271 | A1* | 11/2012 | Diguet | G06F 17/50 703/1 |
| 2012/0316840 | A1* | 12/2012 | Dayde | G06F 17/509 703/1 |
| 2013/0013268 | A1* | 1/2013 | Woolf | G06F 17/50 703/1 |
| 2013/0041508 | A1* | 2/2013 | Hu | B25J 9/162 700/259 |

OTHER PUBLICATIONS

Hui et al., A 3D interactive assembly, simulation mobile application for intelligent configurable robot, Dec. 2012, 1 page.*

* cited by examiner

ROBOTICS CONNECTOR

This application claims the benefit of U.S. provisional application Ser. No. 61/900,572, filed Nov. 6, 2013 entitled "Robotics Connector" and is incorporated by reference herein.

BACKGROUND

While automation has revolutionized much of industrial manufacturing, product assembly for consumer items is still performed by manual labor for the most part. Manual labor is dominant because current industrial automation solutions do not meet consumer industry needs. In order to replace manual labor significantly, automation should reduce, eliminate, or make more adaptive such labor that the remaining labor costs are less than the capital and maintenance cost of the automation replacing the labor.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar parts through the several views.

Figure 1:
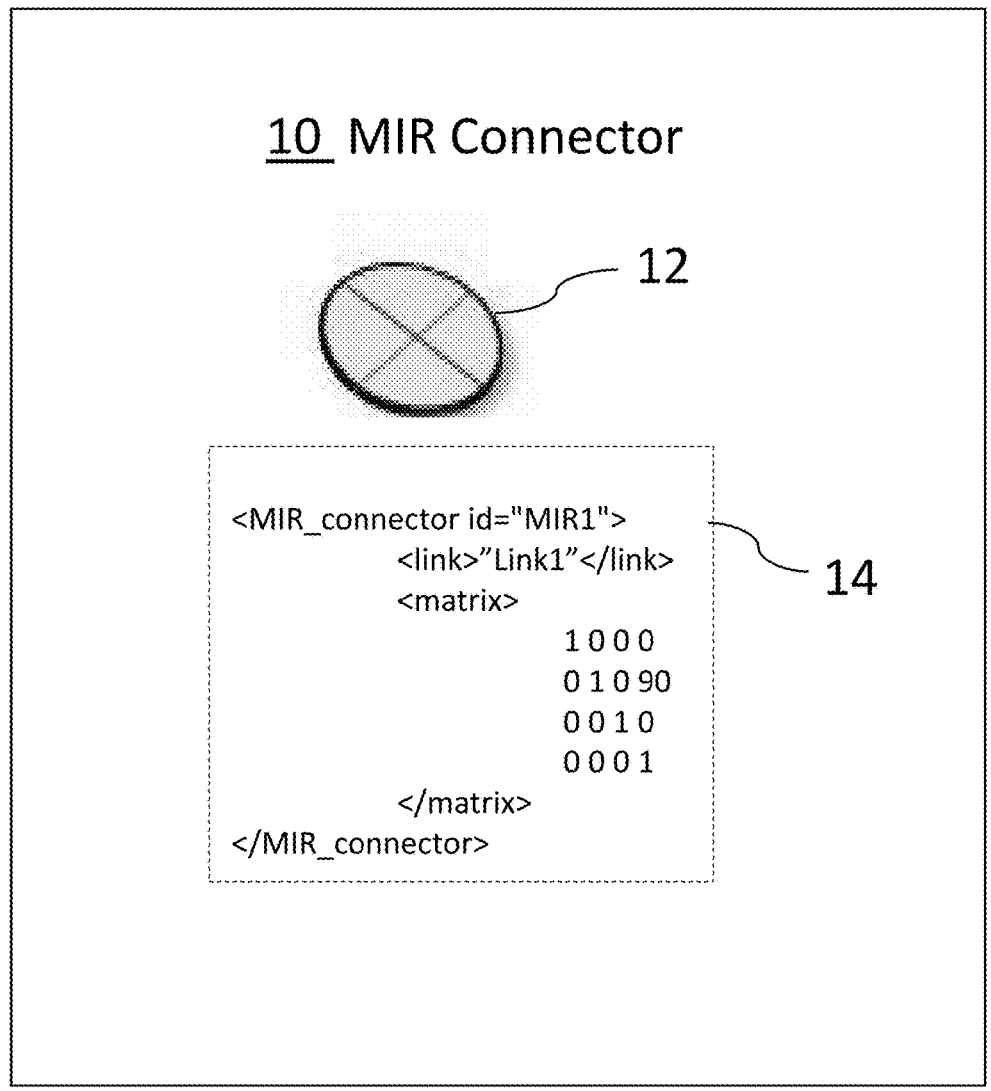
FIG. 1 is a schematic representation of an example MIR Connector and its constituent properties.

It should be noted that the drawings are not true to scale. Further, various parts of the elements or components have not been drawn to scale. Certain dimensions have been exaggerated in relation to other dimensions in order to provide a clearer illustration and understanding of the present invention.

DETAILED DESCRIPTION

In order to address the need for better automation in all industries, the inventor has conceived of a modular assembly platform that is competitive with manual labor in terms of cost, flexibility, and adaptivity. The platform enables rapid introduction of new products on existing assembly machines thereby reducing the capital and ongoing maintenance costs of automation. The platform has a simple, intuitive, and fast approach for programming different types of product assembly operations thereby allowing for greater flexibility and adaptivity than currently available. The existing industrial assembly machines allow for programming using various methods such as 1) text based programming, 2) setting configuration data in text files like extensible markup language (XML), 3) setting configuration data through user interface screens, 4) online teaching, 5) offline simulation, and/or 6) computer aided design and computer aided manufacturing (CAD/CAM).

Most of these existing robotic programming methods do not utilize the rich information available from product CAD data. While some CAD/CAM systems may have an intuitive user interface and make some use of product CAD data, CAD/CAM programming tends to be limited to cutting, machining, welding, or similar operations. The existing methods also do not represent spatial information in a way that is intuitive to the user. For instance, CAD/CAM systems output "G code", a widely used numerical control (NC) programming language. "G code" is a primitive language dedicated mainly to computer numerical control (CNC) machining and generally lacks the logic constructs of higher languages and the information needed to represent complex assembly operations. Many assembly operations use information feedback from sensors like imaging systems to help guide or assist in motion, and most current CAD/CAM programming does not have adequate provisions or logical constructs for dealing with this type of programming.

This disclosure presents a new methodology for programming assembly operations using three-dimensional (3D) modeling that is more intuitive and flexible than existing methods. This new methodology allows for the rapid set up and assembly of new products using existing robotic assembly platforms. The new methodology makes use of both product CAD data and robotic system CAD data to provide an intuitive way to model an assembly process. This assembly process allows for modeling the control of a robotic system using a new concept called a Modular Industrial Robotics (MIR) Connector (MIR Connector) which was conceived by the inventor. The new methodology is referred to herein as the MIR Model 20 (see FIG. 2)).

FIG. 1 shows MIR Connector 10 and its constituents as a software object model. MIR Connector 10 is used to help create a 3D graphics model of a robotic system in such a way that model primitives of the robotic system can be extracted for use by robot control software. A MIR Connector 10 includes a software abstraction that represents the mechanical or optical interface between different modules of a robotic system, the work area, and the work piece assemblies for graphic modeling and robot control.

For example, a robotic system is modeled by a developer using an existing 3D solid modeling program (like Solid Works™ that has a MIR Connector 10 software object modification added to it). The MIR Connector 10 object model has a graphic representation 12 property, so that its position and orientation can be easily determined by the model developer within the 3D solid modeling program. Using the 3D solid model program, the model developer attaches one or more MIR Connectors 10 to a solid model of each of the modular components of the system. The MIR Connectors 10 allow the modular components to be easily assembled together by connecting the components to each other at respective MIR Connectors 10 to form a complete system without the need for solid modeling skills by the model developer (see FIG. 10).

The MIR Connector 10 is an added software object element in the 3D solid model, however, it is also has an abstract data type 14 property that can be used for robot control software. The MIR Connector 10 abstract data type 14 has information data that identifies which modular component the MIR Connector 10 is attached to and the position (including orientation) where the MIR Connector 10 is attached on the component. In one example, the MIR Connector 10 stores the position information as a rigid affine coordinate transform matrix describing the 3D position and orientation of the connector relative to the coordinate system of the modular component it is attached to. Other examples may use other coordinate transform techniques. For instance, coordinate transforms can also be represented by two vectors: a translation vector and a rotation vector. The translation vector is a combination of three floating point numbers representing the XYZ coordinates in Euclidean space (a regular 3D Cartesian coordinate system). The rotation vector may be represented by many different forms such as Euler angles, or quaternion. In one example, there may be a form of rotation vector that uses a unit vector to represent the rotation axis and another value to represent the magnitude of the rotation. As another example, there may be also a coordinate transform technique that uses a translation vector and a rotation matrix.

Further, the MIR Connector 10 abstract data type 14 is a model primitive that need only contain the information required to model the system for robot control, and nothing more is essential, however, it could contain other useful data depending on the application. For instance, MIR Connectors 10 need not contain other solid modeling data, such as information about the shape and surface of solid objects, although it could be included in some applications. The MIR Connector 10 data is extracted from the graphic model of the modular component and transferred to the robotic machine controller without the need to transfer other solid modeling information whether present or not, thereby greatly reducing the amount of information required to simulate and control a modular robot. The MIR Connector 10 abstract data type 14 can be represented as an object in either object oriented control code, as a text file format like XML for communications (see FIG. 1) or in a database format for storage and retrieval from a data storage medium.

Accordingly, a modular industrial robotics (MIR) connector object module may include a graphical image property for a 3D solid model program, and a property with an abstract data type 14. The abstract data type property has a property for a component identifier that is configured to identify a component in the 3D solid model program the MIR connector 10 is associated with. The abstract data type 14 property also has a coordinate transform matrix describing a 3D position and orientation of the MIR connector 10 relative to a coordinate system of the component in the 3D solid model program. The MIR connector 10 is configured to be attachable to one of multiple components in the 3D solid model program. Thus, rather than being a 3D solid modeled component of a modular industrial robotic system that has a great number of and complexity of data to describe the solid modeled component, the MIR connector 10 is a symbolic object with simply a graphical image, an identifier and a collection of extracted abstract data from the 3D solid modeled component with which it is associated. Multiple MIR Connectors 10 may be combined to create a MIR model of a modular robotic system or other mechanical system to allow for increased productivity in programming, simulating, and controlling such systems.

Figure 2:
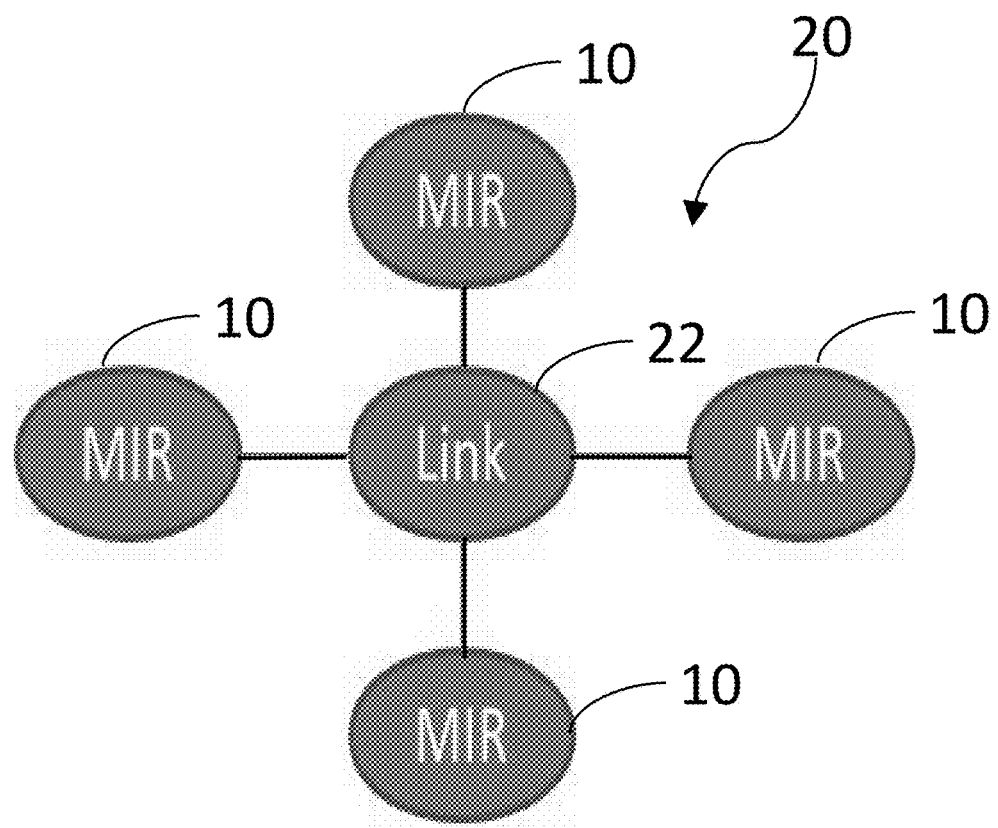
FIG. 2 is a schematic representation of an example MIR Model for a single link.

FIG. 2 shows an example first MIR Model 20 for a single link 22. In this new methodology of MIR Model programming for robotic control, the solid model of the modular robotic system is made up of modular components connected together by MIR Connectors 10, each with usually different respective abstract data type 14. Many modular components are modeled as rigid bodies, which are known as "links" in the field of kinematics. An existing solid model of a component can easily become a link 22 for the first MIR Model 20 by attaching one or more MIR Connectors 10 to it in the solid modeling program. There can be different types of links 22 to represent different elements or components within a modular robotic system.

Figure 3:
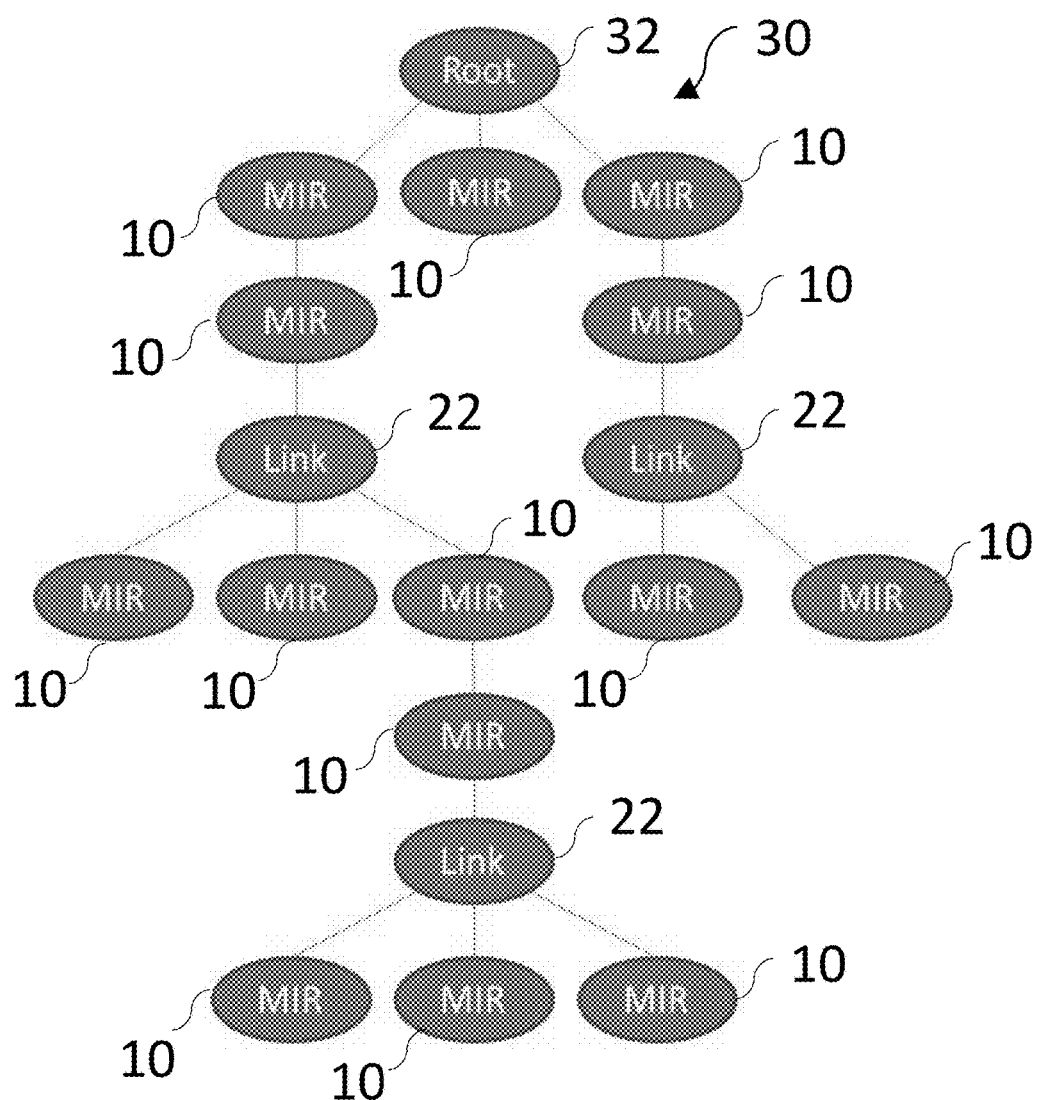
FIG. 3 is a schematic representation of an example MIR Model having multiple links in a tree graph.

FIG. 3 is an example of a second MIR Model 30 with several links 22 in a tree graph. A "link chain" is known in the field of 3D kinematics as series of kinematic links. In the MIR Model 30 the links 22 that form a chain are connected by MIR Connectors 10. The MIR Connectors 10 are attached one to the other to form a chain of links 22 with the MIR Connector 10 of a higher level link 22 attached to the MIR Connector 10 of a lower level link 22. In the 3D modeling environment the user attaches modular components together with MIR Connectors 10 to build chains. The root link is the highest level link that forms the base for all chains, and also the origin of the robot global coordinate system. A chain has a series of MIR Connectors 10 each with a coordinate transform in the abstract data type 14 property. The series of coordinate transforms of a chain can be multiplied one by the other to determine the position of the end of the chain.

The second MIR Model 30 can be represented by a tree graph as shown in FIG. 3. The tree graph is commonly used in computer science to represent data with hierarchical relationships, and tree graphs are commonly used to represent the hierarchy of chain links in robot systems. However, the common implementation of the tree graph must be modified here to accommodate the MIR connector 10. The nodes marked MIR represent MIR Connectors 10, and the nodes marked Link represent model links 22. All MIR Connectors 10 have a respective coordinate transform in abstract data type 14 that represents the position of the MIR Connector 10 relative to the link coordinate system 42 (see FIG. 4) they are attached to.

As noted, FIG. 3 shows a tree graph of a MIR 30 model with multiple links connected together by MIR Connectors 10. In robot kinematics the root link 32 shown at the top of the diagram represents the origin of the global coordinate system. When two MIR Connectors 10 are attached to each other the connector with a path to the root node becomes the parent node and the other becomes the child node. The coordinate transform for a MIR Connector 10 must be inverted when traversing the tree graph from a MIR Connector 10 node towards a link node.

A structural model represents the structure of the machine without containing any information about the behavior of the machine. A structural model is made up of various structural links connected by MIR Connectors 10. Several different type of structural links may be used to assemble a MIR structural model.

Figure 4:
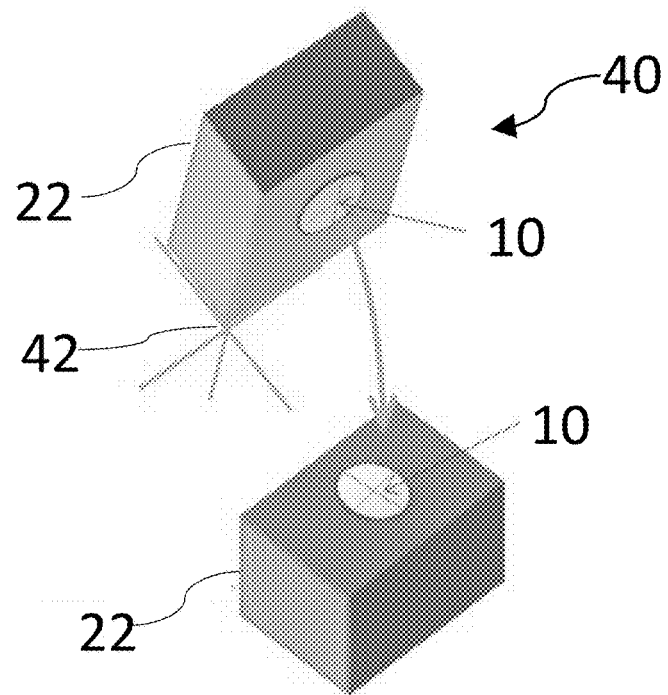
FIG. 4 is a schematic representation of an example rigid solid link.

FIG. 4 is an example of a rigid body link 40 with MIR Connectors 10. A rigid body link 22 represents a non-deformable structural member having a link coordinate system 42. Respective MIR Connectors 10 are attached to the surface of rigid body links 22, so that they can connect to other links by connecting their MIR Connectors 10 together as shown in FIG. 4.

Figure 5A:
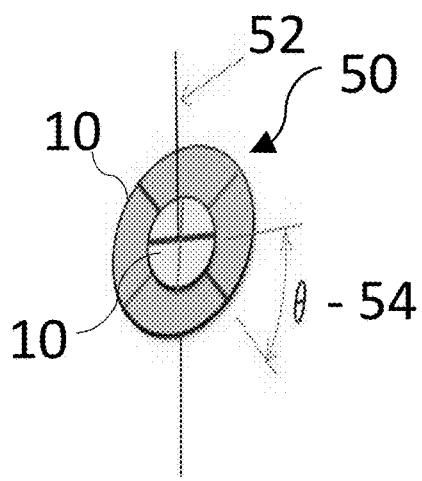
FIGS. 5A and 5B are schematic representations of example revolute and prismatic joint links, respectively.
Figure 5B:
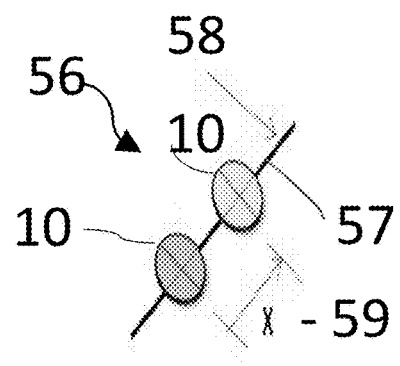

FIGS. 5A and 5B are examples of constrained motion joints. A joint is a type of link that represents constrained motion. There are two types of joints that are constrained to a single degree of freedom: the revolute joint 50 and prismatic joint 56.

As shown in both examples in FIGS. 5A and 5B, the MIR Connector 10 joint is represented by a single axis and a single value, where the axis represents the motion constraint (rotational θ54 or linear x 59) and the value represents the amount of displacement from the link coordinate system 42 and the MIR Connector 10.

FIG. 5A is an example of a revolute joint 50 having a revolute joint axis 52 and rotational displacement θ54. The revolute joint provides rotation displacement θ54 constrained to rotate about a single axis such as revolute joint axis 52. The revolute joint 50 has two parallel MIR Connectors 10 attached to the revolute joint axis 52 such that the axis is normal to the surface of the respective link 22 and centered on MIR Connectors 10. A single parameter 'θ' 54 represents the rotational displacement of the joint.

The prismatic joint 56 provides motion constrained to move along a single linear axis 57, such as prismatic joint axis 58 and a distance 'x' 59. The prismatic joint 56 is represented by two parallel MIR Connectors 10 with the X axes collinear with joint axis 57. A single parameter 'x' 59 represents the separation between the MIR Connectors 10.

MIR Connectors 10 can also be used to model other joints with one or more additional degrees of freedom, in a similar way for each degree of freedom.

Figure 6:
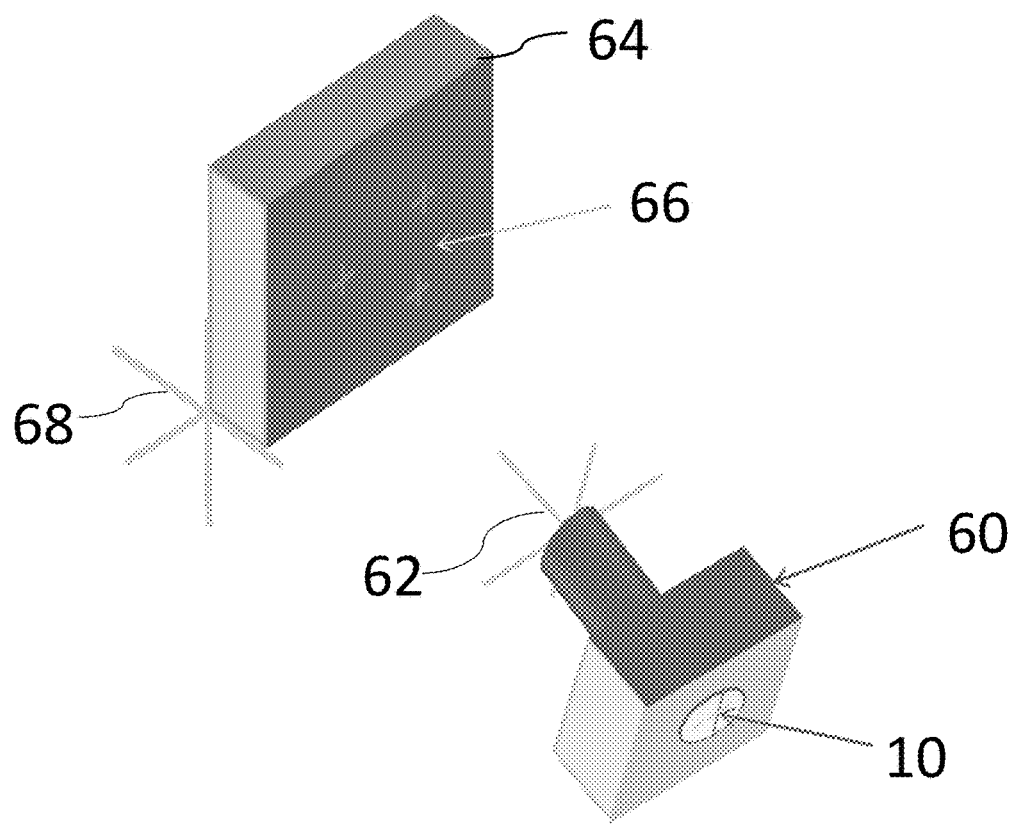
FIG. 6 is a schematic representation of an example camera link.

FIG. 6 is an example of a camera link module. A camera link 60 is also a link type in the MIR Model 20. The camera link 60 represents a pinhole camera model with pinhole camera model coordinate system 62 defined according to standard conventions for a pinhole camera model, which includes both intrinsic and extrinsic parts of the camera. The pinhole camera model coordinate system 62 is the coordinate system for the camera link 60 and can be related to the object coordinate system 68 of a reference object 64 having key points of interest 66 on the reference object 64. Each of the key points of interest 66 as well as the object coordinate system 68 can have a MIR Connector 10 attached if needed for modeling the system. A MIR Connector 10 is attached to the camera module housing to connect the camera to the rest of the system. The camera link 60 thus allows for an optical link to be defined in a system.

Figure 7:
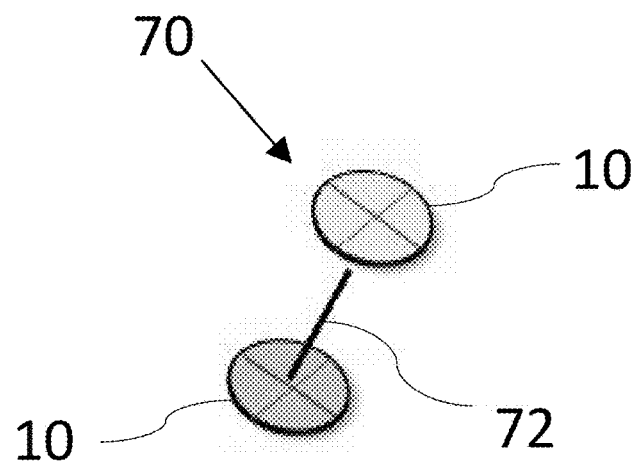
FIG. 7 is a schematic representation of an example offset link.

FIG. 7 is an example of an offset link 70 including a pair of MIR Connectors 10. An offset link 70 is used to model an error or other offset displacement 72 between an actual system of modules and the ideal model of that system. Offset links 70 have two MIR Connectors 10 each with a respective offset transformation matrix in the abstract data type 14 (FIG. 1) that represents the position and orientation of one MIR Connector 10 relative to the other based on the offset displacement 72. Accordingly, an offset link 70 can be used in one example to model a calibration offset. In another example, it can be used to adjust for mechanical differences due to temperature. During system calibration or ongoing maintenance, the respective offset links' 70 offset transformation matrixes can be determined by a loop solver as described below using sensor data (such as a camera link 60 for example) which measures the respective physical locations of the modules with MIR Connectors 10 in the system.

A behavioral model of a modular machine system describes the behavior of the machine independent of the structure of the machine. In other words the behavior model has information about the automated process being performed independent of the machine that will perform the process. The behavior model usually involves models of material that the machine will process as well as models that represent processes that will be performed on the material. The following behavior links may be used in the MIR Model 20 to help complete the overall system behavior.

Material that will be processed by the robot is modeled as a rigid body link 40 (FIG. 4) in the MIR Model 20 creating a material link. MIR Connectors 10 are attached to the material as needed to connect it to the machine and to mark where particular components are physically placed or located relative to the overall system.

Figure 8:
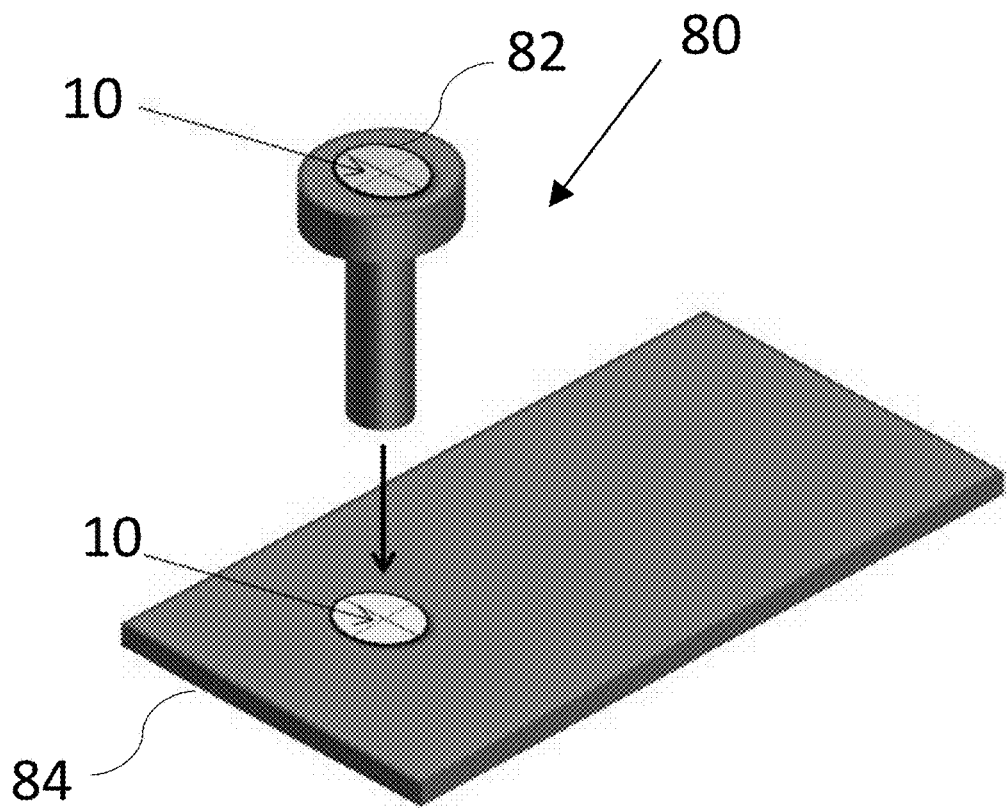
FIG. 8 is schematic representation of an example assembly of components.

FIG. 8 is an example of component part assemblies 80. Assemblies 80 are modeled by connecting two or more material links together with respective MIR Connectors 10. For example, typical assemblies include fasteners (for example, a pop rivet and corresponding hole) and pick-and-place components (for example, resistors, capacitors, integrated circuit packages, etc.). In one example as shown in FIG. 8, these material link assemblies may also have MIR Connectors 10 attached to the top where the part or first material link 82 is connected to the robot end effector (not shown). If the position of the component is sensed while it is on the end effector, the end effector can have an offset link 70 attached to it, which models any error between the nominal position of the end effector and the actual position. The location where the first material link 82 is to be placed by the robot end effector may include a MIR Connector 10 at second material link 84. Second material link 84 may also have an offset link 70 to model any error or compensate for manufacturing tolerances that may be sensed, such as with camera link 60.

The behavior model may also have other model primitives to provide a complete model of assembly robot behavior. These model primitives would be attached to the material being processed and have coordinates local to material such as object 64 and its key points of interest 66 as shown in FIG. 6. There are also other 1D or 2D models that can be combined with the 3D MIR Model 20 to provide a more comprehensive description of robot behavior.

For example, a 1D model is a point. A point represents a 3D position. Unlike MIR Connectors 10, points do not represent any particular angular orientation. In an example system, a point may represent robot behavior like inspection points, image key points, a root node, or an end of a line.

One example of a 2D model is a line. Lines may represent edges for imaging or tool paths for operations like cutting, welding, or dispensing. Lines are located by points at each end. Another 2D example is a surface. Surfaces may be used for point cloud (a combination of points on a surface) registration. Surfaces may also be described by simple geometry like plane, cylinder, sphere, or cone equations or matrixes.

The 2D image processing may be used to create a 2D image model. The 2D image processing may be combined with a 3D MIR Model 20 to determine spatial information by using solvers like pose estimation, camera calibration, or stereo imaging. In addition, a 2D wave form model may be created from 2D wave form graphs. For example, a 2D wave form graph may be combined within the 3D MIR Model 20 to define velocity profiles for a paths or to define other signals that are a function of path distance parameter or time. Other time based models may include scheduling methods. For example, methods such as Gantt charts can be used for high level scheduling of behaviors that are modeled through the 3D MIR Model 20.

The MIR Model 20 may also include one or more solvers, used to determine the respective contents of the abstract data types 14 of MIR Connectors 10 and other behavioral models described above.

One example loop solver uses a chain loop. A chain loop is formed by connecting two chains, each with respective MIR Connectors 10. A chain loop can describe many of the geometric problems in robotics that can be solved by solvers. The job of the solver is to determine the value of unknown parameters of the model, such as those in abstract data type 14, required to close the loop. Closing the loop constrains the chains of the model so that unknown parameters of the model can be solved for. When two chains are connected to form a loop, this creates what is called a cycle in graph theory, which makes the graph no longer conform to a graph tree such as in FIG. 3. A chain loop can be used to setup a particular loop solver for many types of 3D problems including but not limited to one or more of: forward kinematics solver, inverse kinematics solver, camera calibration solver, pose estimation solver, and point cloud registration solver.

To program a loop solver with MIR Connectors 10, a user can simply and intuitively setup a 3D problem for the loop solver by creating a loop in the MIR Model 20. A loop is created by connecting two MIR Connectors 10 on respective different chains. After establishing a loop it can be graphically highlighted in the modeling tool by changing the color of the links that make up the loop.

After defining a loop the user selects the type of solver to use and the unknown parameters to solve for. As examples, if the user selects a forward kinematics solver one or more offset links 70 are selected to solve for. If the user selects an inverse kinematics solver one or more joint links 50 are selected to solve for. If the user selects a camera calibration solver a camera link 60 is selected to solve for. If the user selected pose estimation, or point cloud registration one or more offset links 70 are selected to solve for.

A loop solver may also be used to program calibrations, image guided motion, or an offset for a part on the end effector of a pick-and-place robot. It can also be used to program inverse kinematics to follow a motion path. A solver could also be programmed by selecting multiple MIR Connectors 10 to close the loop generating multiple solutions.

Figure 9:
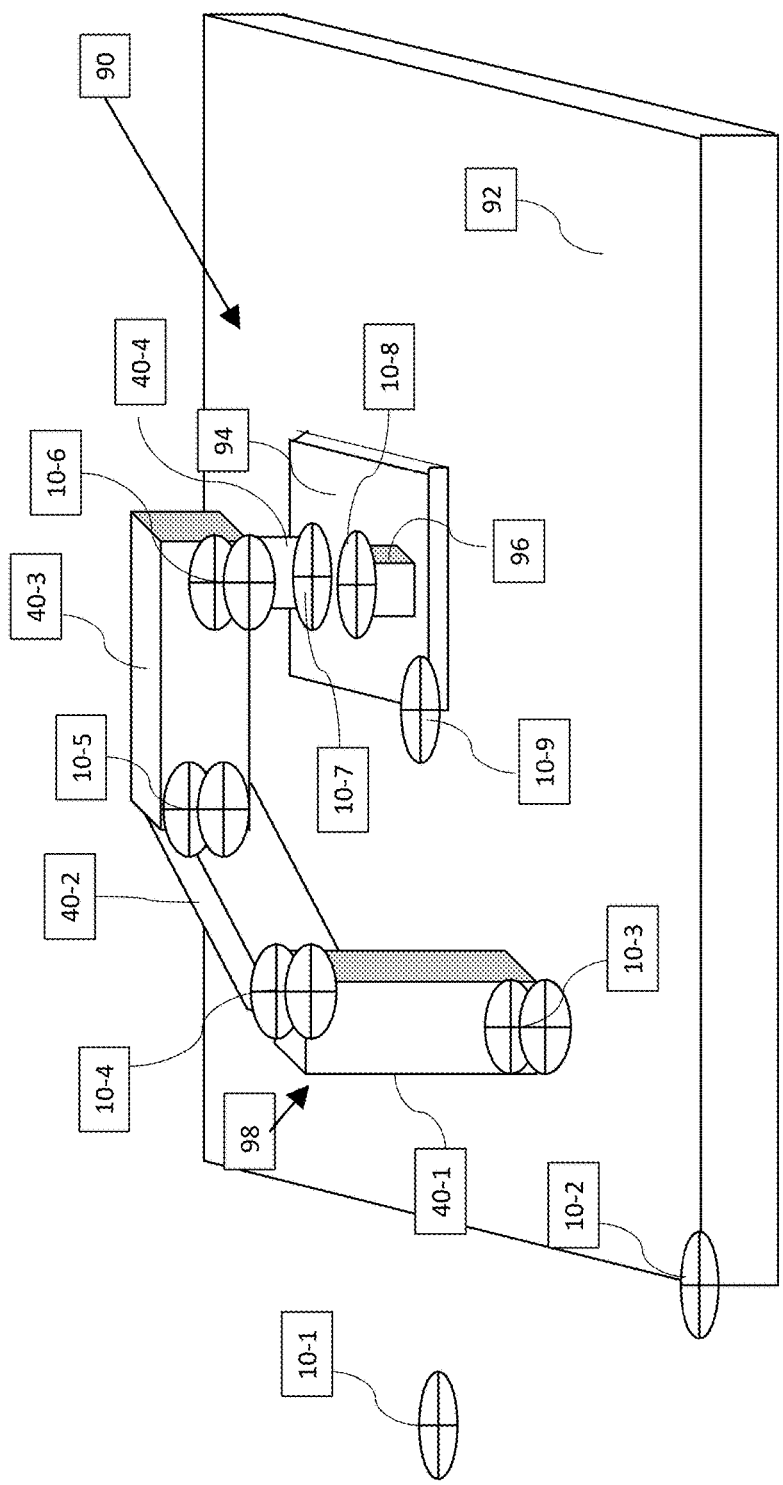
FIG. 9 is a schematic representation of an example modular robotic system.

FIG. 9 is an example modular industrial robotic system 90 modeled in a 3D solid modeling tool having a work platform 92 and a work area 94 containing a work piece assembly 96 operated upon by robotic arm 98. Robotic arm 98 is made up of several rigid body link components, first arm 40-1, second arm 40-2, third arm 40-3, and manipulator 40-4.

Several MIR Connectors 10 (10-1 to 10-9) have been positioned on various components or system model surfaces. For instance, MIR Connector 10-1 represents a global coordinate point. MIR Connector 10-2 represents a work platform coordinate point on work platform 92 for a reference frame. MIR Connector 10-2 can also include an abstract data type 14 transform matrix which allows it to be referenced in relation to the global coordinate point at MIR Connector 10-1. MIR Connectors 10-3 represents a set of MIR Connectors 10, one positioned on the work platform 92 where the robotic arm 98 attaches to it, and a second positioned on the first arm 40-1 surface that attaches to the work platform 92. MIR Connectors 10-4 also represents a set of MIR Connectors 10 representing revolute joint axis links where first arm 40-1 and second arm 40-2 are attached. MIR Connectors 10-5 represents another set of revolute joint axis links where second arm 40-2 and third arm 40-3 are attached. MIR Connectors 10-6 represent another set of MIR Connectors 10, however, depending on the robotic system, may be another pair of revolute joint axis links or a pair of prismatic joint axis links or a combination thereof. MIR Connectors 10-6 are located at the attachment of manipulator 40-4 to the third arm 40-3. At the bottom end of manipulator 40-4 is a rigid body link MIR Connector 10-7. Depending on calibration needs, environmental settings, or other factors, MIR Connector 10-7 may also include an offset link. MIR Connector 10-7 represents an interface to the work piece assembly 96 which also has a rigid solid link MIR Connector 10-8. Work area 94 also has a MIR Connector 10-9 located at a coordinate point to help reference the work area 94 to the work platform 92.

To calculate the various transform matrixes for each of MIR Connectors 10-1 to 10-9, a loop can be formed between MIR Connectors 10-1→10-2→10-3→10-4→10-5→10-6→10-7→10-9 and back to 10-1 to allow for solving the respective abstract data type 14 transform matrixes for the robotic arm 98. Similarly, a loop can be constructed with MIR Connectors 10-1→10-2→10-9→10-8 and back to 10-1 to solve for the respective abstract data type 14 transform matrixes for the work piece assembly. After both loops have been solved they are tied to the same coordinate reference via MIR Connector 10-1. No knowledge or information of the actual solid 3D models is required in order to program the robotic arm 98 to operate on work piece assembly 96. This allows for a simple abstraction of the 3D model of the modular industrial robotic system both for modeling and control. Various robotic module links can be assembled, simulated, modeled, and programmed without a user having to understand complex programming languages or needing 3D solid modeling skills as traditionally required. Such easier modeling and control may now include offline robot simulation, calculation of the affine or other coordinate transforms, automatic calculation of the robot trajectory along tool paths, and numerical calculation of velocity and acceleration, all of which previously required complex programming and modeling skills.

Accordingly, programming with MIR Connectors 10 provide advantages over conventional offline teaching with robot simulation. The location of programming points using MIR Connectors 10 are clearly marked. The use of MIR Connectors 10 helps to constrain to 6 degrees (3 angular, 3 linear) of freedom and defines precise positions. Finally, multiple MIR Connectors 10 can be selected to automatically create loops for solving. The MIR Model 20 allows the loops to describe a broad range of problems for 3D solvers.

Figure 10:
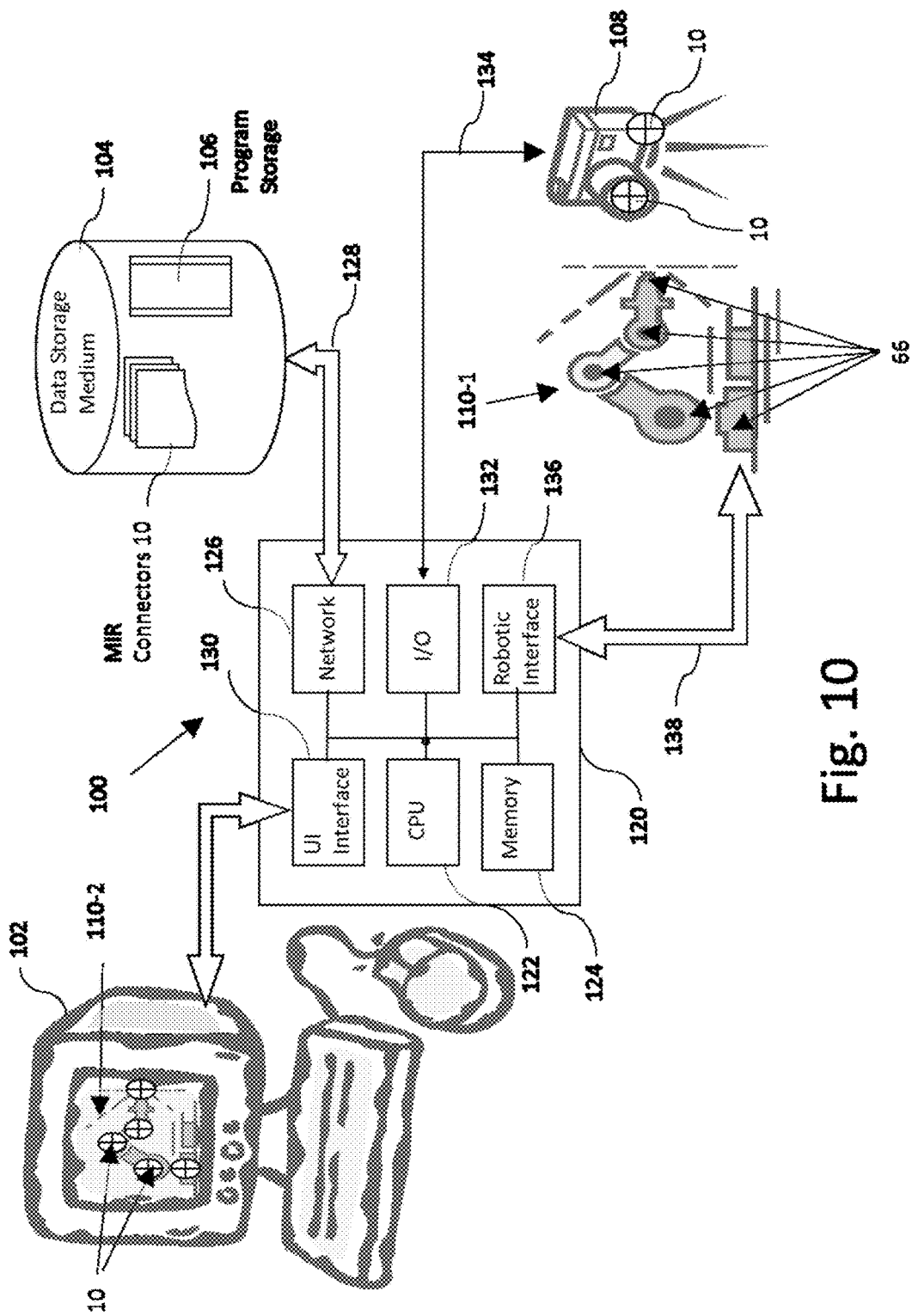
FIG. 10 is a schematic drawing an example computer system to model and control a modular robotic system.

FIG. 10 is a schematic drawing of an example MIR modeling and controller system 100 which may be used to implement various aspects of the disclosed subject matter. A computer system 120 having one or more central processing units 122, for example Intel Core, ARM, or PowerPC processors, is connected to tangible computer readable memory 124, such as random access memory (RAM), dynamic RAM (DRAM) or static RAM (SRAM), and tangible computer data storage medium 104, such as hard disk drives, solid state drives or other long term tangible or persistent media. MIR Connectors 10 may be stored on data storage medium 104 along with an operating system (such as Windows™ or Linux™), one or more 3D solid modeling program, simulation programs, loop solvers and other programs in tangible program storage 106. Programs and MIR Connectors 10 may be loaded by the CPU 122 into computer readable memory 124 to model and/or simulate operation of an actual robotic system 110-1 and displayed and controlled by the user on computer terminal 102 via user-interface (UI) 130 which may include a display, keyboard, mouse or other entry devices including touchscreens and drawing pads. A rendering of model robotic system 110-2 is displayed on the computer terminal 102 for manipulation by a user. A user may add MIR Connectors 10 in one or more locations on the model robotic system 110-2 to allow for the solving of chain loops to create the respective abstract data types 14 which are then stored by the CPU 122 on the data storage medium 104. The data storage medium 104 may be connected to computer system 120 via a high speed network 128, such as IEEE-1394, USB, SERCOS, DeviceNet, Ethernet, Gigabit Ethernet, etc. or other communication system via network interface 126.

Actual robotic system 110-1 is controlled via one or more robotic interface busses 138, such as I²C, USB, motor interfaces, proprietary robotic interfaces, etc. via robotic interface 136 which is connected to CPU 122. In some examples, the operation of actual robotic system may be observed with a camera link module with camera 108 connected to computer system 120 via an I/O interface 132 and image/video bus 134, such as USB or IEE 1394. Camera 108 may include one or more MIR connectors 10 to model the observations of the camera for the 3D modeling and control programs operating on computer system 120 to locate key points of interest 66 on the actual robotic system 110-1 for calibration, error correction, or environmental factors.

While the present invention has been particularly shown and described with reference to the foregoing examples, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A non-transitory data storage medium comprising data and programs readable by a processor to control a modular industrial robot system having robotic system modules, comprising:
   a software program to assemble link chains of selected multiple components with respective attached modular industrial robotics (MIR) connector object models to form tree graphs representing a structural model of the modular industrial robot, the respective attached MIR connector object models each including:
   a graphical image property for a 3D solid model program; and
   an abstract data type property having,
      a component identifier property configured to identify a component in the 3D solid model program, and
      a coordinate transform matrix describing a 3D position and orientation of the respective attached MIR connector object model relative to a coordinate system of the component in the 3D solid model program;
   a loop solver program to allow a user to create a loop of multiple attached MIR connector object models on different link chains and to select one of multiple types of loop solvers to solve for a parameter in the configurable abstract data type property; and
   a robot controller program to control the robotic system modules and wherein the configurable abstract data types are to be extracted from the 3D solid model program and downloadable to the robot controller program for use in robot control calculations.

2. The non-transitory data storage medium of claim 1 wherein the coordinate transform matrix is a rigid affine coordinate transform matrix.

3. The non-transitory data storage medium of claim 1 wherein the graphical image property is a first graphical image property and further comprising a second graphical image property for the 3D solid model program wherein the second graphical image property is visually different than the first graphical image property.

4. The non-transitory data storage medium of claim 1 wherein the abstract data type property contains only the information needed to model the modular industrial robotic system for robot control and does not contain solid modeling information about the component it is attached to in the 3D solid model program.

5. A system for modeling and controlling a modular industrial robot having multiple robotic system modules, comprising:
   a computer system having a 3D solid modeling program installed in a data storage medium;
   one or more modular industrial robotics (MIR) connector object models stored on the data storage medium, each including
      a graphical image property for the 3D solid model program, and
      a configurable abstract data type property having
         a component identifier property configured to identify a component in the 3D solid model program, and
         a coordinate transform matrix describing a 3D position and orientation of the MIR connector relative to the component in the 3D solid model program, the MIR connector object configured to be attachable to one of multiple components in the 3D solid model program;
   a computer terminal configured to display the multiple components of the 3D solid model program with the respective graphical image property representing the position and orientation of the multiple components;
   a software program installed on the data storage medium configured to allow a user to represent the modular industrial robot graphically in the 3D solid model program along with respective graphical MIR connectors, the software program further to assemble link chains of selected multiple components with respective attached MIR connectors to form tree graphs representing a structural model of the modular industrial robot; and
   a loop solver program installed on the data storage medium to allow a user to create a loop of multiple MIR connectors on different link chains and to select one of multiple types of loop solvers to solve for a parameter in the configurable abstract data type property.

6. The computer system of claim 5, further including:
   a camera that includes a camera MIR connector object model; and
   a camera link module installed on the data storage medium to observe the robotic system using the camera and wherein the camera link module and the camera MIR connector object model allow for observations of the camera to locate key points of interest on the robotic system for at least one of the group of calibration, error correction, and environmental factors.

7. The computer system of claim 5, wherein the respective attached MIR connectors are configured to allow the tree graphs to represent a behavioral model of the modular industrial robot.

8. The computer system of claim 7, wherein the software program is configured to allow the structural model and the behavioral model to be developed independently and integrated on the system.

9. The computer system of claim 5 wherein the configurable abstract data type property contains only the information needed to model the system for robot control and does not contain solid modeling information about the component it is attached to in the 3D solid model program.

10. The computer system of claim 5, further comprising:
a robot controller program installed on the data storage medium and configured to control the robotic system modules and wherein the configurable abstract data types are configured to be extracted from the 3D solid model program and configured to be downloadable to the robot controller program for use in robot control calculations.

11. The computer system of claim 10,
wherein the robot controller program is to provide an automatic calculation of the trajectory of the robotic system along tool paths, and numerical calculation of velocity and acceleration.

12. The computer system of claim 5, wherein the multiple types of loop solvers include one or more of pose estimation, forward kinematics, inverse kinematics, and point cloud registration.

13. The computer system of claim 5, wherein the multiple types of loop solvers are calibration solvers and include one or more of camera calibration, image guided motion, offset calibration.

14. The computer system of claim 5, where multiple MIR connectors are allowed to close the loop of link chains and multiple types of loop solvers are used to solve for multiple parameters.

15. The computer system of claim 5 wherein the one or more MIR connector object models are configured to model one or more of kinematic robot joints, cameras, position errors as offsets, and assemblies of components.

16. A non-transitory data storage medium comprising data and programs readable by a processor to model and control a modular industrial robot (MIR), including:
a software program to allow a user to represent the MIR graphically in the 3D solid model program in a user interface along with respective graphical MIR connector object models, and to assemble link chains of selected multiple components with respective attached MIR connector object models to form tree graphs representing a structural model of the MIR, the MIR connector object models each including:
a graphical image property for a 3D solid model program, and
a configurable abstract data type property having:
a component identifier property to identify a component in the 3D solid model program, and
a coordinate transform matrix describing a 3D position and orientation of the MIR connector object model relative to the component in the 3D solid model program, the MIR connector object model to be attachable to one of multiple components in the 3D solid model program;
and
a loop solver program to allow a user to create a loop of multiple MIR connector object models on different link chains and to select one of multiple types of loop solvers to solve for a parameter in the configurable abstract data type property.

17. The non-transitory data storage medium of claim 16, further including a robot controller program to control the MIR over one or more robotic interfaces and wherein the configurable abstract data types are-to be extracted from the 3D solid model program and downloadable to the robot controller program for use in robot control calculations.

18. The non-transitory data storage medium of claim 17, further including a camera link module to observe the robotic system using a camera that includes a camera MIR connector object model.

19. The non-transitory data storage medium of claim 18 wherein the camera link module and the camera MIR connector object model allow for observations of the camera to locate key points of interest on the MIR for at least one of the group of calibration, error correction, and environmental factors.

20. The non-transitory data storage medium of claim 17 wherein the robot controller program is to provide an automatic calculation of the trajectory of the MIR along tool paths, and numerical calculation of velocity and acceleration.

* * * * *